United States Patent
Janis et al.

(10) Patent No.: US 10,027,391 B2
(45) Date of Patent: Jul. 17, 2018

(54) TRANSMIT DIVERSITY ON A CONTROL CHANNEL WITHOUT ADDITIONAL REFERENCE SIGNALS

(71) Applicant: Nokia Technologies Oy, Espoo (FI)

(72) Inventors: Pekka Janis, Espoo (FI); Honglei Miao, Espoo (FI)

(73) Assignee: Nokia Technologies Oy, Espoo (FI)

( * ) Notice: Subject to any disclaimer, the term of this patent is extended or adjusted under 35 U.S.C. 154(b) by 159 days.

(21) Appl. No.: 14/389,265

(22) PCT Filed: Apr. 5, 2013

(86) PCT No.: PCT/FI2013/050375
§ 371 (c)(1),
(2) Date: Sep. 29, 2014

(87) PCT Pub. No.: WO2013/153276
PCT Pub. Date: Oct. 17, 2013

(65) Prior Publication Data
US 2015/0055581 A1 Feb. 26, 2015

Related U.S. Application Data

(60) Provisional application No. 61/623,330, filed on Apr. 12, 2012.

(51) Int. Cl.
*H04B 7/04* (2017.01)
*H04B 7/0456* (2017.01)
(Continued)

(52) U.S. Cl.
CPC ........... *H04B 7/046* (2013.01); *H04B 7/0456* (2013.01); *H04B 7/0626* (2013.01); *H04L 1/04* (2013.01);
(Continued)

(58) Field of Classification Search
CPC .... H04B 7/0456; H04B 7/046; H04B 7/0626; H04L 1/04; H04L 1/0643; H04W 72/042
(Continued)

(56) References Cited

U.S. PATENT DOCUMENTS

2010/0067512 A1\* 3/2010 Nam ................... H04B 7/068
370/342
2011/0080972 A1\* 4/2011 Xi ...................... H04B 7/0617
375/267
(Continued)

FOREIGN PATENT DOCUMENTS

CN 102239649 A 11/2011
CN 102256358 A 11/2011
(Continued)

OTHER PUBLICATIONS

3GPP TSG-RAN WG1 #68bis R1-121171, Jeju, Korea, Mar. 26th-Mar. 30th, 2012, Source: MediaTek Title: Utilization of DRS Antenna Ports for Diversity and Beamforming Schemes in ePDCCH.\*
(Continued)

*Primary Examiner* — Huy Duy Vu
*Assistant Examiner* — Nizam U Ahmed
(74) *Attorney, Agent, or Firm* — Harrington & Smith

(57) ABSTRACT

Disclosed is a method and an apparatus providing antenna port sharing and a demodulation reference signals (DMRS) based precoding scheme for a distributed enhanced physical downlink control channel (E-PDCCH) using, for example, spatial frequency block codes (SFBC)/frequency selective transmit diversity (FSTD) transmit diversity. The method exhibits the same performance as SFBC/FSTD transmit diversity using un-precoded DMRS while not prohibiting another UEs' localized E-PDCCH to be potentially multiplexed in a same physical resource block (PRB) pair. The
(Continued)

SFBC/FSTD transmission is facilitated by mapping a subset of layers to DMRS ports used by other UEs for localized and beamformed transmission, while the precoders for the remaining layers are selected to be orthogonal to the other UEs precoders thereby providing good performance wide minimizing DMRS port usage. Specifically, no additional DMRS ports are needed for spatial diversity transmission.

25 Claims, 7 Drawing Sheets

(51) Int. Cl.
*H04B 7/06* (2006.01)
*H04L 1/04* (2006.01)
*H04L 1/06* (2006.01)
*H04W 72/04* (2009.01)

(52) U.S. Cl.
CPC ......... *H04L 1/0643* (2013.01); *H04W 72/042* (2013.01)

(58) Field of Classification Search
USPC .......................................................... 370/329
See application file for complete search history.

(56) References Cited

U.S. PATENT DOCUMENTS

| | | | |
|---|---|---|---|
| 2011/0194551 A1* | 8/2011 | Lee | H04B 7/0626 370/342 |
| 2013/0039284 A1* | 2/2013 | Marinier | H04L 5/001 370/329 |
| 2013/0242947 A1* | 9/2013 | Chen | H04W 72/04 370/335 |
| 2014/0016714 A1* | 1/2014 | Chen | H04B 7/024 375/260 |
| 2014/0050159 A1* | 2/2014 | Frenne | H04W 72/042 370/329 |

FOREIGN PATENT DOCUMENTS

| | | |
|---|---|---|
| CN | 102395206 A | 3/2012 |
| CN | 102415038 A | 4/2012 |
| EP | 2124350 A1 | 11/2009 |
| WO | 2010058245 A1 | 5/2010 |
| WO | WO-2011055989 A2 | 5/2011 |

OTHER PUBLICATIONS

"Way Forward on ePDCCH Reference Signals", 3GPP TSG-RAN WG1 #68, R1-120907, Agenda item: 7.6.1, Ericsson, Feb. 6-10, 2012, 2 pages.
"DMRS Based E-PDCCH Transmission Schemes", 3GPP TSG RAN WG1 #68, R1-120186, Agenda item: 7.6.1, Samsung, Feb. 6-10, 2012, pp. 1-6.
"On Reference Signal Design for Enhanced Control Channels", 3GPP TSG-RAN WG1 #68, R1-120076, Agenda Item: 7.6.1, Ericsson, Feb. 6-10, 2012, 4 pages.
"3rd Generation Partnership Project; Technical Specification Group Radio Access Network; Evolved Universal Terrestrial Radio Access (E-UTRA); Physical Channels and Modulation(Release 10)", 3GPP TS 36.211, V10.4.0, Dec. 2011, pp. 1-101.
"3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101, V10.5.0, Dec. 2011, pp. 1-287.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.2.0, Dec. 2012, pp. 1-340.
Extended European Search Report received for corresponding European Patent Application No. 13775854.6, dated Nov. 10, 2015, 4 pages.
"Reference Signals for Epdcch", 3GPP TSG-RAN WG1 #68bis, R1-121021, Agenda Item: 7.6.1, Ericsson, Mar. 26-30, 2012, 6 pages.
"Multiplexing of Two ePDCCH Types", 3GPP TSG-RAN WG1 #69, R1-122003, Agenda Item: 7.6.4.4, Ericsson, May 21-25, 2012, 2 pages.
"Utilization of DRS Antenna Ports for Diversity and Beamforming Schemes in ePDCCH", 3GPP TSG-RAN WG1 #68bis, R1-121171, Agenda Item: 7.6.1, MediaTek Inc., Mar. 26-30, 2012, 5 pages.
"Association of DM-RS for ePDCCHs Within a PRB Pair", 3GPP TSG-RAN WG1 Meeting #68, R1-120385, Agenda item: 7.6.4, Renesas Mobile Europe Ltd., Feb. 6-10, 2012, 5 pages.
International Search Report and Written Opinion received for corresponding Patent Cooperation Treaty Application No. PCT/FI2013/050375, dated Jun. 20, 2013, 12 pages.

* cited by examiner

TRANSMIT DIVERSITY ON A CONTROL CHANNEL WITHOUT ADDITIONAL REFERENCE SIGNALS

RELATED APPLICATION

This application was originally filed as Patent Cooperation Treaty Application No. PCT/FI2013/050375 filed Apr. 5, 2013 which claims priority benefit to U.S. Provisional Patent Application No. 61/623,330, filed Apr. 12, 2012.

TECHNICAL FIELD

This invention relates generally to radio frequency (RF) reception and transmission and, more specifically, relates to downlink control and shared channels such as for example the enhanced PDCCH (E-PDCCH) and PDSCH in the LTE system.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

LTE is often used to refer to the long term evolution of the Universal Terrestrial Radio Access Network radio access technology, more formally known as E-UTRAN. The LTE system is to provide significantly enhanced services by means of higher data rates and lower latency with reduced cost. In the LTE and other cellular radio systems the base station (termed an eNodeB or eNB in LTE) signals the time-frequency resources allocated to a mobile terminal (more generally a user equipment UE). In LTE the downlink and uplink data resources are allocated via the physical downlink control channel (PDCCH) in terms of physical resource blocks (PRBs). The number of PRBs available in a time slot depends on the bandwidth and varies from 6 to 100, corresponding to bandwidths of 1.25 and 20 MHz respectively.

In LTE there is frequency selective scheduling for the downlink (DL) and uplink (UL) shared data channels (physical downlink and uplink shared channels referred to as PDSCH and PUSCH) in order to allocate the best PRBs for each terminal. This gives the best performance but is also the most expensive in terms of signaling. While this scheduling technique allows advanced multi-antenna techniques like precoded transmission and multiple input-multiple output (MIMO) operation for the downlink shared data channel, in conventional LTE the downlink control signaling on the PDCCH does not employ any of these gaining mechanisms (e.g., frequency domain scheduling gain, advanced multi-antenna gains). To exploit some of these gaining mechanisms the third generation partnership project (3GPP) organization has initiated a study item for enhanced downlink control signaling using UE-specific reference signals enabling enhanced multi-antenna transmission also for the DL control channel.

LTE is a heterogeneous network, in which there are access nodes apart from the traditional base stations/eNodeBs which operate at different power levels. For example, there may be privately operated femto nodes to which the conventional (macro) eNodeBs can offload traffic; and/or there may be remote radio heads (RRHs) in traffic hot spot areas or repeaters to fill coverage holes. Heterogeneous networks are susceptible to widely varying interference, and a future release (LTE-Advanced or LTE-A) of LTE is to include a new logical control channel E-PDCCH to better exploit these heterogeneous network aspects as well as the gaining mechanisms noted above.

It has been proposed that the REs which the E-PDCCH is using within a physical resource block (PRB) pair determine the antenna port (AP) candidates. The UEs have a defined search space in which they must blindly decode in order to find if there is an E-PDCCH directed to them. This search space is limited in order to constrain the complexity and power consumed by the UEs. For example, in conventional PDCCH signaling in the UE specific search space there are six predefined PDCCH candidates for one and two control channel elements (CCEs), and two candidates for four and eight CCEs.

In conventional LTE the concept of CCEs relates to the PRBs as follows. Depending on the specific frame structure and signaling involved, there are 6 or 7 orthogonal frequency division multiplex (OFDM) symbols per slot. There are two slots per radio subframe and each slot has a duration of 0.5 msec. One RE represents one grid point defined by one OFDM sub-carrier and one OFDM symbol. REs are accumulated into RE groups, and one CCE is defined as a set of RE groups. One PRB represents twelve consecutive OFDM subcarriers for one slot, and defines the smallest element of resource allocation assigned by the eNodeB scheduler (1 PRB has a bandwidth of 180 kHz). One PRB pair is the combination of two PRBs in one subframe.

Also below is discussed the concept of aggregation level, which is also a concept in conventional LTE. The aggregation level gives the size of the UE-specific PDCCH search space candidate. There are also common search spaces in addition. For each PDCCH candidate the UE is to blindly detect to check whether there is a PDCCH addressed to that particular UE. Aggregation level 2 means the corresponding PDCCH candidate in the UE-specific search space spans two CCEs; aggregation level 4 means the corresponding PDCCH candidate in the UE-specific search space spans four CCEs, and so forth.

Development of the E-PDCCH is still ongoing in the 3GPP. It is agreed that the E-PDCCH will be demodulated by the UE based on demodulation reference signals (DMRS), which is a precoded reference signal. In conventional LTE for the PDSCH, the related DMRS applies the same precoding as what is used for the data resource elements (REs). This enables precoding the transmitted signal such that the signal quality is improved at the UE as follows. For the case in which the eNodeB has channel state information (CSI) information available, which may include precoding matrix information (PMI) feedback, which the eNodeB receives from the UE, the eNodeB may use this CSI to select which precoding vector to use on the E-PDCCH and/or PDSCH it transmits to that same UE, and the UE may demodulate that same E-PDCCH and/or PDSCH it receives using the DMRS corresponding to that precoding vector. But LTE-Advanced may also facilitate the eNodeB transmitting the E-PDCCH to UEs for which it does not have valid PMI feedback, or for which it has detected that the CSI is unreliable, for example. In this case, UE specific precoding may not provide good performance and a transmit diversity transmission scheme might be more suitable. The teachings below enable efficient transmit diversity schemes for a control channel such as the E-PDCCH that is demodulated by the DMRS.

BRIEF SUMMARY OF THE INVENTION

In a first aspect thereof the embodiments of this invention provide a method that comprises providing antenna port sharing among N antenna ports used for localized control channels and M antenna ports used for distributed control channels. The method is accomplished by selecting a first precoding vector based on channel state information (CSI) related to a user equipment (UE); mapping a first control channel precoded with the first precoding vector for the UE to a localized evolved or enhanced control channel element (E-CCE); assigning the first control channel to a first antenna port selected from the set of antenna ports used for localized control channels; selecting the first antenna port and the first precoding vector for a second control channel; selecting a second antenna port from the set of antenna ports used for distributed control channels for a second control channel; selecting a second precoding vector for the second control channel; and mapping the second control channel precoded with the selected first precoding vector and the selected second precoding vector to a distributed E-CCE that shares a same physical resource block (PRB) pair with the localized E-CCE; and transmitting the first control channel and the second control channel to a set of UEs. In the method N and M are considered to be positive integers.

In another aspect thereof the embodiments of this invention provide an apparatus that comprises a processor and a memory including computer program code. The memory and computer program code are configured, with the processor, to cause the apparatus at least to provide antenna port sharing among N antenna ports used for localized control channels and M antenna ports used for distributed control channels. This is accomplished by operations that comprise selecting a first precoding vector based on channel state information (CSI) related to a user equipment (UE); mapping a first control channel precoded with the first precoding vector for the UE to a localized evolved or enhanced control channel element (E-CCE); assigning the first control channel to a first antenna port selected from the set of antenna ports used for localized control channels; selecting the first antenna port and the first precoding vector for a second control channel; selecting a second antenna port from the set of antenna ports used for distributed control channels for a second control channel; selecting a second precoding vector for the second control channel; and mapping the second control channel precoded with the selected first precoding vector and the selected second precoding vector to a distributed E-CCE that shares a same physical resource block (PRB) pair with the localized E-CCE; and transmitting the first control channel and the second control channel to a set of UEs. In the apparatus N and M are positive integers.

DETAILED DESCRIPTION

Figure 1:
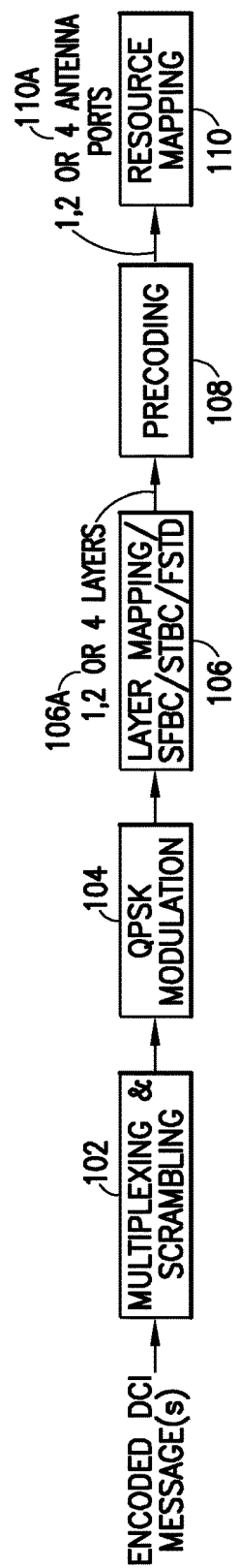
FIG. 1 is an exemplary processing chain in the eNodeB transmitter for compiling a PDCCH or E-PDCCH for transmission.

As an overview FIG. 1 gives an exemplary processing chain in the eNodeB transmitter describing functionally how the eNodeB compiles the PDCCH or E-PDCCH that it transmits. The downlink control information (DCI, which gives a specific format/size for the PDCCH or E-PDCCH) is encoded and scrambled with UE-specific scrambling codes at block 102, modulated at modulation block 104 and mapped to the different spatial layers/space time coded at block 106. In case of E-PDCCH transmission, the precoding vector or vectors are imposed at block 108, and these correspond directly with the DMRS that the UE will use on the receiving end to demodulate the E-PDCCH it receives. The thus obtained precoded complex symbols are then mapped to physical resource elements (RE). The compiled E-PDCCH is then transmitted from multiple (typically 2 or 4) eNodeB antennas for spatial diversity and/or beamforming on the radio resources that are mapped at block 110.

Figure 2:
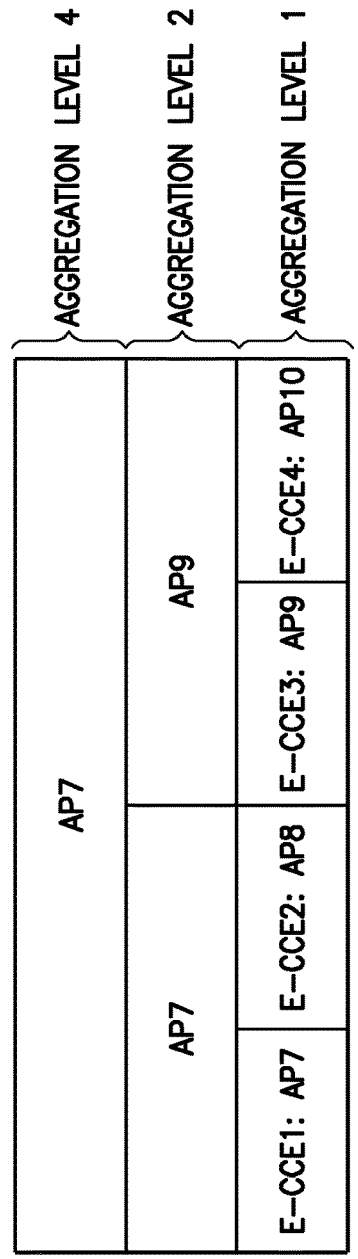
FIG. 2 is a table illustrating for a single physical resource block pair mapping of demodulation reference signal antenna ports to the localized E-PDCCH for three different aggregation levels.

The E-PDCCH region configured for a UE is to be in PRB pairs (for example, four PRB pairs). Each PRB pair may be further divided into, for example, four E-CCEs (CCEs for the E-PDCCH). FIG. 2 illustrates an example mapping of DMRS antenna port configuration for the E-PDCCH consistent with the suggestion set forth in document R1-120907 by Ericsson, ST-Ericsson, NTT Docomo, Interdigital, Renesas and Samsung entitled: WAY FORWARD ON EPDCCH REFERENCE SIGNALS (3GPP TSG-RAN WG1 #68; Dresden, Germany; Feb. 6-10, 2012). These are virtual antenna ports, which can be formed by applying beamforming to the eNodeB's physical antenna array. As FIG. 2 illustrates, the bottom row corresponds to four E-CCEs on aggregation level 1, the second row corresponds to aggregation level 2, and the top row corresponds to aggregation level 4. Thus the PRB pair of FIG. 2 accommodates four E-PDCCH candidates in aggregation level 1, two in aggregation level 2, and one in aggregation level 4.

The E-PDCCH search space should have the localized E-PDCCH candidates and also the distributed E-PDCCH candidates which mainly aim at achieving frequency diversity in the absence of frequency specific channel state information (CSI) at the eNodeB. Localized E-PDCCHs are sent on one PRB pair whereas distributed transmission refers to the E-PDCCH being on multiple PRB pairs. Document R1-120186 by Samsung and entitled: DMRS BASED E-PDCCH TRANSMISSION SCHEMES (3GPP TSG-RAN WG1 #68; Dresden, Germany; Feb. 6-10, 2012) suggests that transmit diversity for the distributed E-PDCCH transmission can be achieved using DMRS based spatial frequency block codes (SFBC) and/or frequency switching transmit diversity (FSTD) by using per-resource element precoder cycling and/or per-resource block precoder cycling. Document 120076 by Ericsson and ST-Ericsson entitled: ON REFERENCE SIGNAL DESIGN FOR ENHANCED CONTROL CHANNELS (3GPP TSG-RAN WG1 #68; Dresden, Germany; Feb. 6-10, 2012) suggest a per-resource element group antenna selection where unprecoded DMRS ports 7 and 9 are served as localized common reference signals.

From a transmit diversity point of view the precoder cycling of document R1-120186 is equivalent to antenna cycling, in that each symbol is transmitted through only one effective channel to the receiver. However in the SFBC/STBC/FSTD scheme (STBC is space time block code), each symbol is transmitted through two effective channels to the receiver. The SFBC/STBC/FSTD approach therefore offers more diversity and more robust decoding performance than the precoder cycling schemes. Document R1-120186 indicates that the SFBC approach outperforms the precoder cycling scheme, especially in the high signal to noise ratio (SNR) region where sufficiently good channel estimates are available. Hence, a transmission mode based on SFBC/FSTD is the better choice for the baseline transmit diversity scheme for the distributed E-PDCCHs.

The suggested solution for the E-PDCCH in each of the above documents assumes that the distributed and localized E-PDCCHs are transmitted in separate PRB pairs. However, multiplexing the distributed and localized E-PDCCHs in the same PRB pair may allow more efficient E-PDCCH resource usage.

Consider now an example of a potential shortfall inherent in transmitting distributed and localized E-PDCCHs in different PRB pairs. If for example un-precoded DMRS port 7 and 8 are used for the transmit diversity scheme in the distributed E-PDCCH in E-CCE1 (un-precoded since the eNodeB has no valid CSI from which to select a precoder for the distributed E-PDCCH), then the E-CCE2 with DMRS port 8 as shown in FIG. 2 cannot be used for the localized E-PDCCH transmission. A possible configuration which avoids this problem is to use a transmit diversity scheme with aggregation level 2 on E-CCEs 1 and 2, while only the E-CCEs 3 and 4 could be used for localized E-PDCCH transmission. In the event of the SFBC/STBC/FSTD with 4 transmit antennas being used there would not be any possibility for localized transmission in the same PRB pair since all DMRS ports would be occupied. Thus the above documents do not allow using transmit diversity only on a single E-CCE per PRB pair.

Multiplexing distributed and localized E-PDCCH candidates in the same PRB pair facilitates more accurate adaptation of the control resource overhead. For example, it is possible to allocate the first E-CCE in a sub set of PRB pairs of the E-PDCCH region as the distributed E-PDCCH resources. Each distributed E-PDCCH candidate at a certain aggregation level, including aggregation level 1, may be transmitted over multiple PRB pairs of the E-PDCCH region. To further improve the performance of distributed E-PDCCHs, transmit diversity could also be supported. One characteristic of transmit diversity schemes is that the UE needs to estimate multiple channels, each corresponding to a spatial layer. This can be enabled by assigning multiple DMRS antenna ports to the distributed E-CCE. However, as discussed above, there are only a limited number of antenna ports available in each PRB pair, which limits the possibilities to multiplex distributed transmit diversity and localized beam-formed E-PDCCH transmissions in the same PRB pair.

As further detailed below embodiments of these teachings support spatial (transmit) diversity for distributed E-PDCCH. In particular, these embodiments enable the distributed and localized E-PDCCHs to be multiplexed in the same PRB pair without blocking each other due to the limited number of available DMRS antenna ports.

As an overview, exemplary embodiments of these teachings provide a DMRS based precoding scheme for the distributed E-PDCCH using SFBC/STBC/FSTD transmit diversity. This approach has similar performance as the SFBC/STBC/FSTD transmit diversity using un-precoded DMRS, but does not block other UEs' localized E-PDCCH to be potentially multiplexed in the same PRB pair. In these exemplary embodiments the SFBC/STBC/FSTD transmission is facilitated by mapping a subset of layers to DMRS antenna ports that are used by other UEs for localized and beam-formed transmission, while the remaining layer precoders may be chosen to be orthogonal to the other UEs precoders. In this manner good performance is guaranteed and at the same time the DMRS port usage is minimized. Specifically, no additional DMRS ports are needed for spatial diversity transmission as compared to localized precoded transmission.

It can be noted that precoder switching transmit diversity at a resource element (RE) level could be used instead of SFBC/STBC/FSTD. The precoder switching transmit diversity is similar to FSTD but not necessarily in the frequency direction (also in the time direction).

Figure 3:
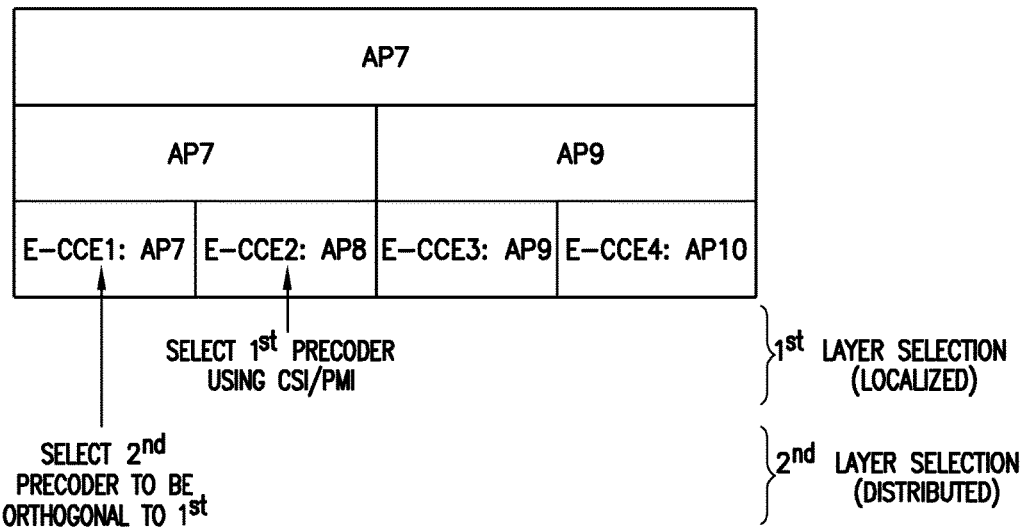
FIG. 3 reproduces FIG. 2 and additionally shows DMRS selection for the case in which two UEs are scheduled by an E-PDCCH and CSI is available for only one of them according to an exemplary embodiment of these teachings.

These general concepts are best explained by way of examples set forth at FIGS. 3-6. Consider first FIG. 3 which shows how these teachings might be applied to the mapping table of FIG. 2 when the eNodeB is using two transmit antennas for transmit diversity and there are only two UEs. The 2 transmit antenna SFBC/STBC/FSTD can be used for transmit diversity for the distributed E-PDCCH. FIG. 3 assumes that two UEs' E-PDCCHs are to be multiplexed in the same PRB pair; one is a distributed E-PDCCH1 for the UE1 to be allocated within the E-CCE1, and the other is a localized E-PDCCH2 for UE2 to be allocated in the E-CCE2. In this example, there are two E-PDCCHs transmitted in one PRB: E-PDCCH1 of UE1 is mapped to E-CCE1, and E-PDCCH2 of UE2 is mapped to E-CCE2. E-PDCCH1 of UE1 will be transmitted in a distributed manner, meaning E-PDCCH1 will span over multiple PRB pairs so that only a portion of E-PDCCH1 will be mapped to the described E-CCE1 and another portion will map to E-CCE1 of some other PRB pair. These examples below detail mapping for one PRB pair; mapping to the other PRB pairs for the distributed transmissions are the same as the described PRB mapping.

Based on the CSI reported by UE2, the eNodeB selects a specific precoding vector for the DMRS antenna port 8 to apply beam-forming for the E-PDCCH2. This is the first layer selection shown at FIG. 3 during which is selected the precoders for the localized E-PDCCH, for UE2 in this case. Antenna port 8 maps to E-CCE2 in FIG. 3 so E-PDCCH2 for UE2 will be sent on E-CCE2. According to these teachings then DMRS ports 7 and 8 will be used to support the spatial transmit diversity for the distributed E-PDCCH1 for UE1. Here DMRS port 8 has been selected according to the UE2's CSI. In order to furnish the same transmit diversity effect as that using un-precoded DMRS port 7 and 8 for the E-PDCCH of UE1, the precoding vector for the DMRS port 7 should be orthogonal to that used for the DMRS port 8. So in the second layer precoder selection the precoder for the (distributed) E-PDCCH1 to be sent to UE1 is selected to be orthogonal to the precoder selected in the first layer, and will map to E-CCE1, and will use ports 7 and 8. In this manner the localized E-PDCCH mapped to the E-CCE2 with DMRS port 8 can be coexist with the distributed E-PDCCH mapped to the E-CCE1 using DMRS port 7 and 8.

SFBC/STBC/FSTD with orthogonal precoding vectors for ports 7 and 8 will have similar performance as the same transmission scheme with un-precoded precoding vectors. To explain why, assume that the effective channel coefficients of using un-precoded vectors corresponding to the DMRS port 7 and 8 are h1 and h2, respectively. Assume that the cross-correlation of h1 and h2 is 0, and the mean transmit powers of h1 and h2 are 1. Note that the precoding applied on port 8 appears as random for UE1, since the channels to UE1 and UE2 are uncorrelated. It follows, and can be easily shown, that the cross-correlation of the effective channel coefficients of port 7 and 8 with orthogonal precoding is then also zero. Because the performance of the SFBC based transmit diversity is affected by the cross-correlation of the effective channels, then the orthogonal precoding-based SFBC/STBC/FSTD would perform similar as that using un-precoded DMRS ports.

Figure 4:
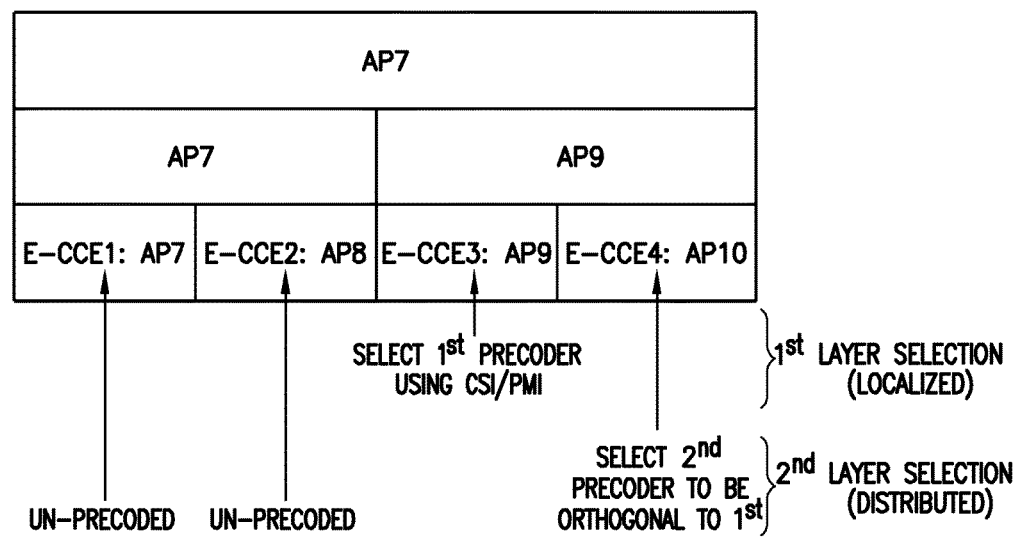
FIG. 4 reproduces FIG. 2 and additionally shows DMRS selection for the case in which four UEs are scheduled by an E-PDCCH and CSI is available for only one of them according to another exemplary embodiment of these teachings.
Figure 5:
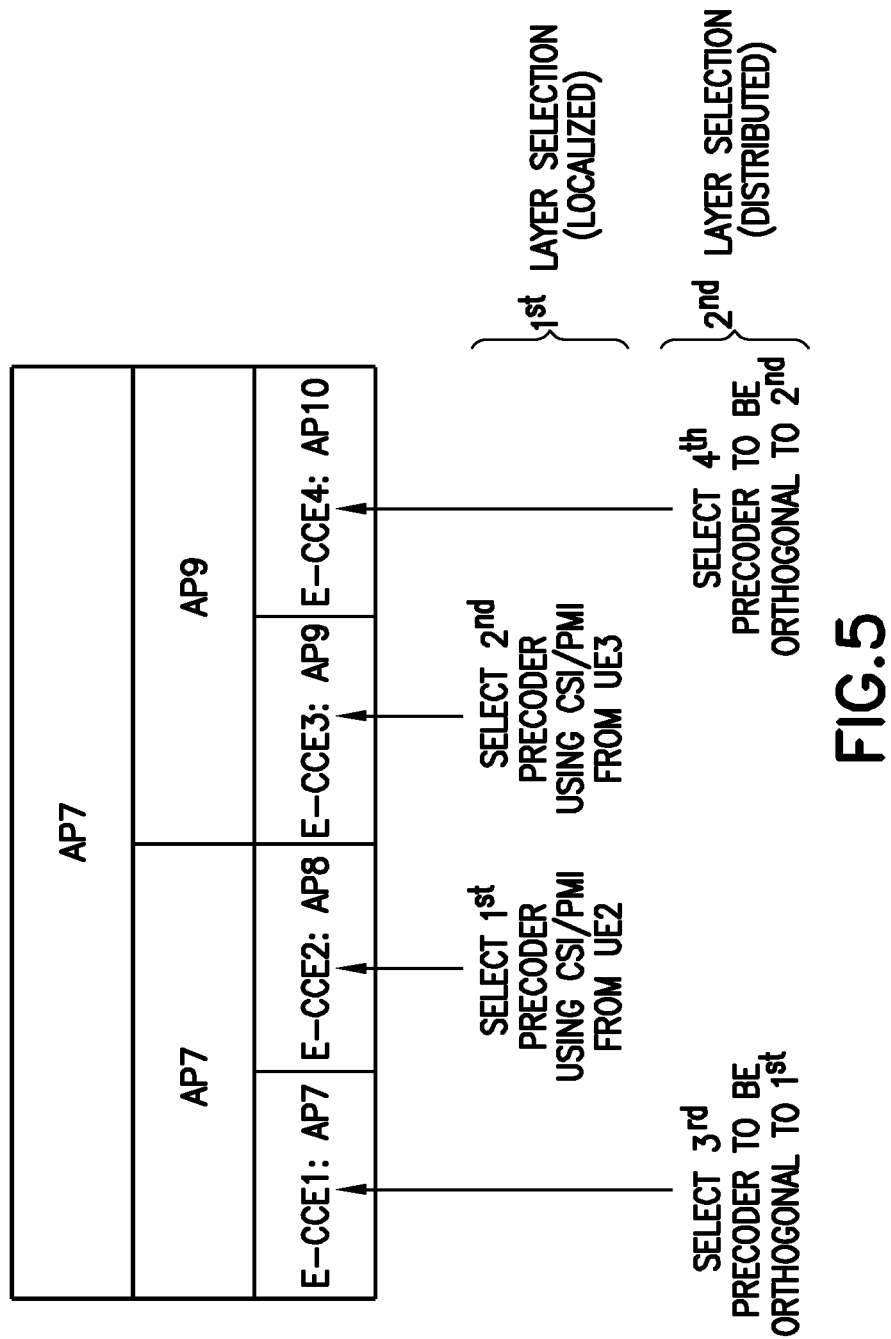
FIG. 5 reproduces FIG. 2 and additionally shows DMRS selection for the case in which four UEs are scheduled by an E-PDCCH and CSI is available for only two of them according to another exemplary embodiment of these teachings.
Figure 6:
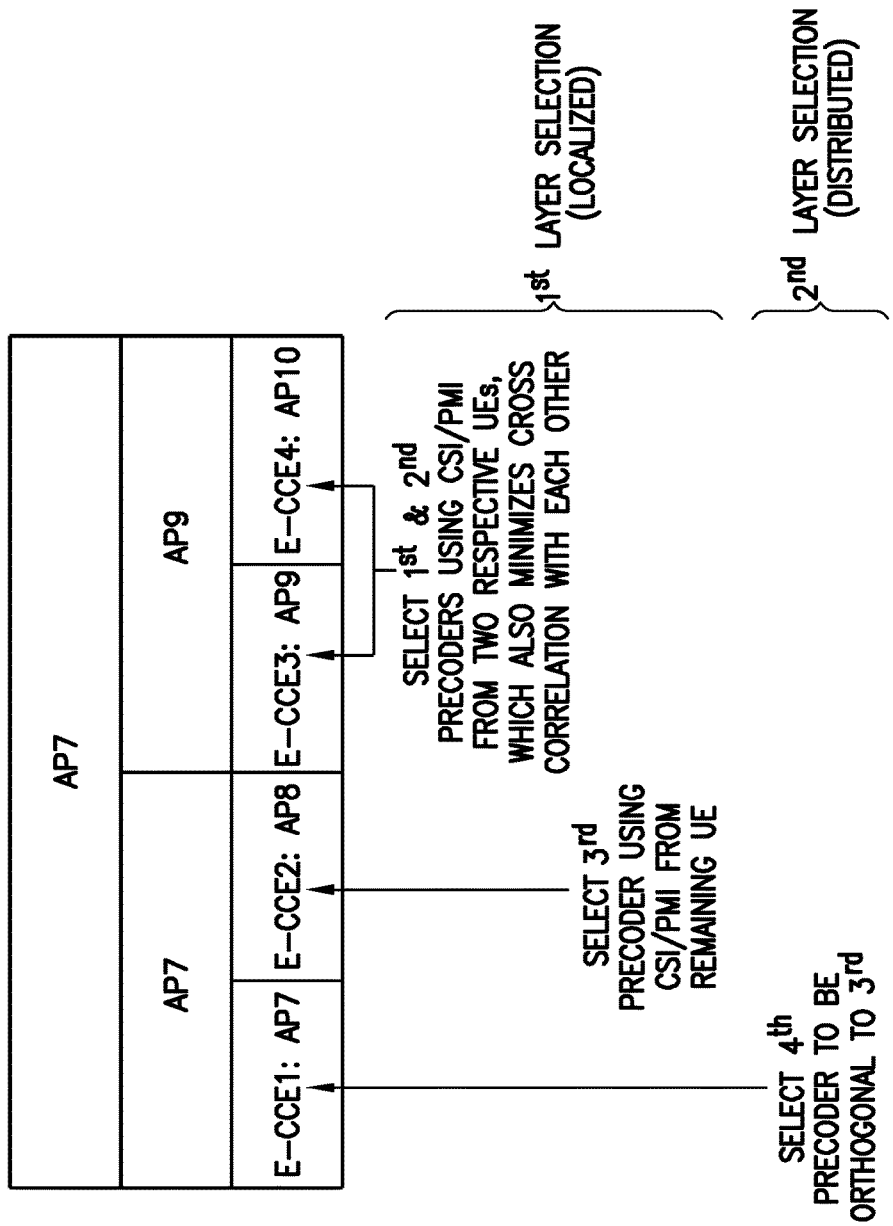
FIG. 6 reproduces FIG. 2 and additionally shows DMRS selection for the case in which four UEs are scheduled by an E-PDCCH and CSI is available for only three of them according to another exemplary embodiment of these teachings.

FIGS. 4-6 illustrates other examples using the same E-CCE to antenna port mapping as illustrated for FIGS. 2-3, but these examples assumes the eNodeB will use four transmit antennas. For example, four transmit antenna SFBC+FSTD similar to what is used in PDCCH may be used for the transmit diversity of the distributed E-PDCCH. In these examples the distributed E-PDCCH with SFBC+FSTD similar to the PDCCH transmission mode specified in LTE Release 8 would require DMRS ports 7-10.

In the specific four-antenna example of FIG. 4 there is, like for the FIG. 3 example, one distributed E-PDCCH multiplexed with one localized E-PDCCH. For FIG. 4 we assume the eNodeB has valid CSI for UE2 but none for UE1 and these are the only two UEs being scheduled with this E-PDCCH PRB pair, and so the one localized E-PDCCH for UE2 is mapped to E-CCE3 in the first layer precoder selection, and accordingly the DMRS port 9 is used for this localized E-PDCCH. Similar to the underlying concept in FIG. 3, for the FIG. 4 example the precoding vectors for the distributed E-PDCCH for UE1 with 4 transmit antenna SFBC/STBC/FSTD can be selected in the second layer as follows. The precoding vector for DMRS port 10 which maps to E-CCE4 is selected to be orthogonal to the precoding vector used for the DMRS port 9 which maps to E-CCE3, and the DMRS ports 7 and 8 are un-precoded. The scheme can be applied in a similar fashion when the localized E-PDCCH is mapped to E-CCE2 or E-CCE4.

In the specific four-antenna example of FIG. 5 there is one distributed E-PDCCH multiplexed with two localized E-PDCCHs. This example assumes there are two localized E-PDCCHs multiplexed in the same PRB pair. In the first layer precoder selection an E-PDCCH2 for UE2 is mapped for example to the E-CCE2, and an E-PDCCH3 for UE3 is mapped to the E-CCE3 (or to E-CCE3 and E-CCE4 with aggregation level 2). The precoders for E-PDCCH2 and E-PDCCH3 are selected based on the CSIs reported by UE2 and UE3, respectively. Accordingly, the DMRS port 8 and 9 are used for UE2 and UE3, each of which is using a different precoding vector based on its CSI.

In the case illustrated by FIG. 5, the precoding vectors for the distributed E-PDCCH with 4 transmit antenna SFBC/STBC/FSTD can be designed as follows:

DMRS port 7: the precoding vector orthogonal to the precoding vector used for the E-PDCCH2.

DMRS port 8: the precoding vector selected by the localized E-PDCCH2.

DMRS port 9: the precoding vector selected by the localized E-PDCCH3.

DMRS port 10: the precoding vector orthogonal to the precoding vector used for the E-PDCCH3.

The similar scheme can be applied when the localized E-PDCCHs are mapped to other E-CCEx and E-CCEy, where x and y is in the set of {2, 3, 4}, and x is not equal to y.

In the specific four-antenna example of FIG. 6 there is one distributed E-PDCCH multiplexed with three localized E-PDCCHs. If there are three localized E-PDCCHs to be multiplexed in the same PRB pair, for example E-PDCCH2 for UE2, E-PDCCH3 for UE3, and E-PDCCH4 for UE4, it is obvious that E-CCE2 to E-CCE4 will be occupied, and the DMRS ports 8, 9 and 10 are to be used accordingly in the first layer precoder mapping. As with the above examples these localized precoder selections are based on the CSI reported by the respective UEs. Assuming that the channel is flat fading within one PRB, the mapping of the localized E-PDCCH to any E-CCE has no impact on the performance.

In order to improve the performance of the distributed E-PDCCH allocated in the E-CCE1 during the second layer precoder selection, it is advantageous to reduce the cross-correlation between the precoding vectors used for DMRS ports 7 and 8, and those used for DMRS ports 9 and 10. Therefore, among three localized E-PDCCHs we should allocate two localized E-PDCCHs, whose cross correlation of the corresponding precoding vectors has the smallest value among three combinations, to the E-CCE3 and E-CCE4. And the remaining localized E-PDCCH is mapped to the E-CCE2 and antenna port 8. At this point, the precoding vectors for the DMRS port 8, 9 and 10 are decided in the first layer precoder selection.

Similar to the examples at FIGS. 4-5, for FIG. 6 in the second layer precoder selection the precoding vector of the DMRS port 7 would be designed to be orthogonal to the one used for the DMRS antenna port 8. In this specific case the orthogonality of precoders on ports 9 and 10 cannot be guaranteed since depending on the number of UEs to be served and their search space configuration one cannot always find suitable allocations. However, it is reasonable to assume that this would result in only a minor performance loss as compared to the un-precoded SFBC/STBC/FSTD transmission scheme.

If we assume for simplicity that the cross-correlation minimization at the first layer precoder selection results in UE2 getting E-PDCCH2 on E-CCE2; UE3 getting E-PDCCH3 on E-CCE3, and UE4 getting E-PDCCH4 on E-CCE4, the precoding vectors for the distributed E-PDCCH1 with 4 transmit antenna SFBC/STBC/FSTD for the FIG. 6 example are as follows:

DMRS port 7: the precoding vector orthogonal to the precoding vector used for the E-PDCCH2. This is the first spatial layer of the distributed E-PDCCH1.

DMRS port 8: the precoding vector selected by the localized E-PDCCH2. This is the second spatial layer of the distributed E-PDCCH1.

DMRS port 9: the precoding vector selected by the localized E-PDCCH3. This is the third spatial layer of the distributed E-PDCCH1.

DMRS port 10: the precoding vector selected by the localized E-PDCCH4. This is the fourth spatial layer of the distributed E-PDCCH1.

While the above specific examples refer to SFBC/STBC/FSTD as the transmit diversity scheme, these teachings are not so limited and may be employed with similar advantage to other transmit diversity schemes that require estimation of more than one channel signature at the UE. For example, pure FSTD and per RE precoding vector switching may also see a similar benefit from minimizing the correlation between the diversity branches. Further note that while in the above specific examples the transmit diversity scheme is applied on distributed E-PDCCH, these teachings are equally applicable to the case where the transmit diversity scheme is applied to an E-PDCCH that is mapped to REs in a single PRB pair.

One technical effect of the above exemplary embodiments is that they enable a distributed control channel (such as the E-PDCCH) with SFBC/STBC/FSTD based transmit diversity and localized E-PDCCH with beam-forming to coexist in the same PRB pair to optimize the control channel E-PDCCH resources. The above examples also provide the technical effect of minimizing the DMRS port usage when beam-formed and diversity transmissions are multiplexed into the same PRB pair.

Figure 7:
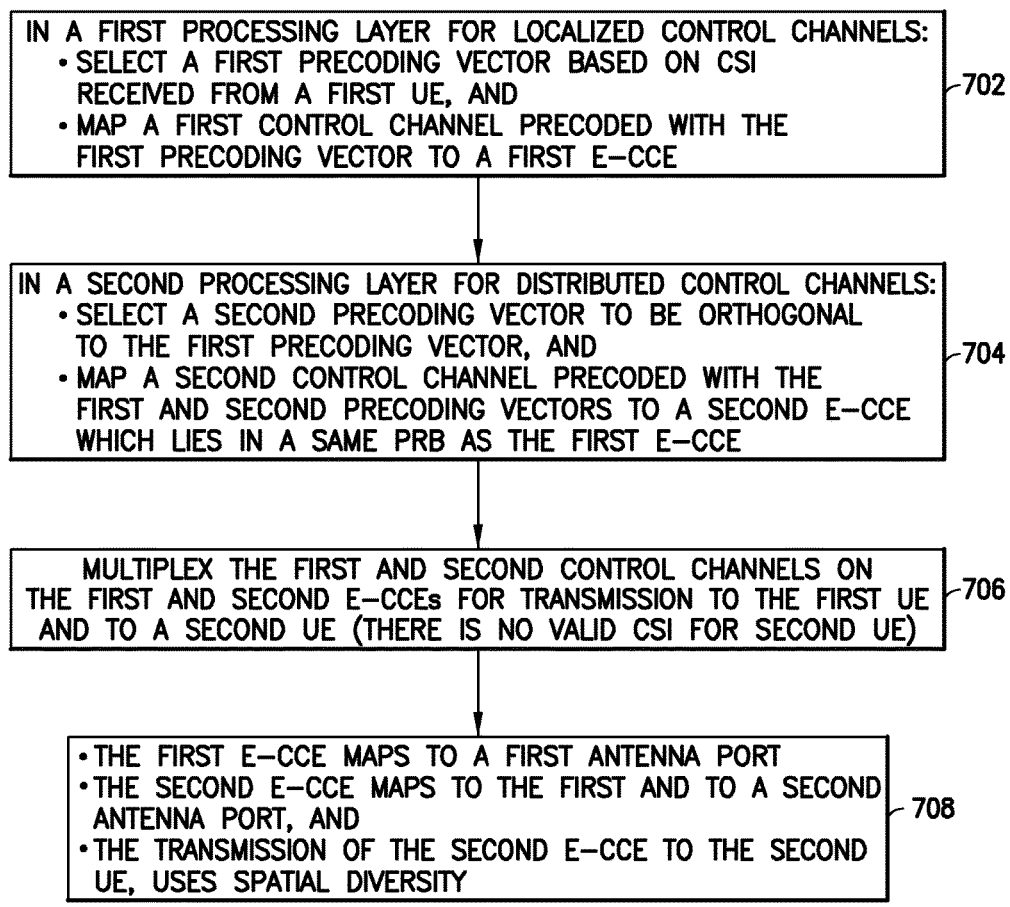
FIG. 7 is a flow diagram illustrating a method, and actions taken by an apparatus, and the result of executing an embodied computer program from the perspective of the eNodeB, according to the exemplary embodiments of the invention.

Turning now to FIG. 7 there is a flow diagram illustrating an exemplary method, and actions taken by a network access node such as a relay node, remote radio head or an eNodeB (or one or more components thereof), and the result of computer program instructions stored on a tangible memory when such instructions are executed by one or more processors. As an example of an apparatus such as the eNodeB performing the steps shown at FIG. 7, such an apparatus may include at least one processor and at least one memory including computer program code, which all together are configured in response to execution of the computer program code to cause the apparatus to perform the process of FIG. 7.

Block 702 summarizes processing by the eNodeB in a first processing layer for localized control channels (E-PDCCH in the above examples). In that first layer a first precoding vector is selected based on CSI received from a first UE, and maps a first control channel precoded with the first precoding vector to a first E-CCE. There may be more first layer processing such as was detailed above with reference to FIGS. 5-6 but this is the minimum per the FIG. 3 example. Block 704 describes that the eNodeB, when subsequently processing for a second layer for distributed control channels, selects a second precoding vector to be orthogonal to the first precoding vector, and maps a second control channel precoded with a transmission diversity scheme with the first and the second precoding vector to a second E-CCE which lies in a same PRB as the first E-CCE. And then block 706 provides that the eNodeB multiplexes the first and second control channels on the first and second E-CCEs for transmission to the first UE and to a second UE, where there is no valid CSI for the second UE.

Block 708 gives the antenna mapping from the above non-limiting embodiments, namely that the first E-CCE maps to a first antenna port, the second E-CCE maps to both the first and the second antenna ports, and also block 708 tells that the transmission of the second E-CCE to the second UE uses spatial diversity (such as SFBC, STBC and/or FSTD).

Extending the FIG. 7 process to the example set forth at FIG. 4, assuming the network access node performing the method of FIG. 7 is using 4-antenna transmit diversity for the second E-PDCCH sent to the second UE, then it follows that:

the first spatial layer of the second E-PDCCH on the first antenna port is precoded with the first precoding vector;

the second spatial layer of the second E-PDCCH on the second antenna port is precoded with the second precoding vector;

the third spatial layer of the second E-PDCCH on a third antenna port is not precoded; and the fourth spatial layer of the second E-PDCCH on a fourth antenna port is not precoded.

Extending the FIG. 7 process to the example set forth at FIG. 5, with the same 4-antenna transmit diversity assumption as above, then in the first layer for the localized control channels the access node/eNodeB will:

select the first precoding vector based on CSI received from the first UE;

select a third precoding vector (e.g., the $2^{nd}$ precoding vector shown at FIG. 5) based on CSI received from a third UE, map the first control channel precoded with the first precoding vector to the first E-CCE; and map a third control channel precoded with a third precoding vector to a third E-CCE that maps to a third antenna port.

In the subsequent second layer for the distributed control channels the access node will:

select the second precoding vector (e.g., the $3^{rd}$ precoding vector shown at FIG. 5) be orthogonal to the first precoding vector, selecting a fourth precoding vector to be orthogonal to the third precoding vector; map the second control channel precoded with the first, second, third, and fourth precoding vectors to the second E-CCE which lies in the same PRB as the first and the third E-CCEs.

Where the control channel is as above the E-PDCCH, then the eNodeB will transmit the second E-PDCCH in a second E-CCE to the second UE on four antenna ports, such that:

the first spatial layer of the second E-PDCCH on the first antenna port is precoded with the first precoding vector;

the second spatial layer of the second E-PDCCH on the second antenna port is precoded with the second precoding vector;

the third spatial layer of the second E-PDCCH on a third antenna port is precoded with the third precoding vector; and the fourth spatial layer of the second E-PDCCH on a fourth antenna port is precoded with the fourth precoding vector.

Extending the FIG. 7 process to the example set forth at FIG. 6, with the same 4-antenna transmit diversity assumption as above, then in the first layer for the localized control channels the access node/eNodeB will:

select the first precoding vector based on CSI received from the first UE, select a third precoding vector based on CSI received from a third UE, select a fourth precoding vector based on CSI received from a fourth UE;

in response to determining that cross correlation is minimized between the third and fourth precoding vectors (e.g., the $1^{st}$ & $2^{nd}$ precoding vectors shown at FIG. 6) as compared to any other pair of the first, third and fourth precoding vectors, map a third control channel precoded with the third precoding vector to a third E-CCE and map a fourth control channel precoded with the fourth precoding vector to a fourth E-CCE; and map the first control channel precoded with the remaining first precoding vector (e.g., the $3^{rd}$ precoding vector shown at FIG. 6) to the first E-CCE that maps to the first antenna port.

Where the control channel is as above the E-PDCCH, then the eNodeB will transmit the second E-PDCCH to the second UE on four antenna ports, such that:

the first spatial layer of the second E-PDCCH on the first antenna port is precoded with the first precoding vector;

the second spatial layer of the second E-PDCCH on the second antenna port is precoded with the second precoding vector;

the third spatial layer of the second E-PDCCH on a third antenna port is precoded with the third precoding vector; and the fourth spatial layer of the second E-PDCCH on a fourth antenna port is precoded with the fourth precoding vector.

Blocks 702, 704 and 706 may be stated for a set of antenna ports used for localized control channels and for a set of antenna ports used for distributed control channels using positive integers N and M which are indexed as j and i respectively (j=1 through N and i=1 through M). An antenna port may be used both for distributed and for localized control channels so that the two sets of antenna ports need not be disjoint. For each of N antenna ports used for localized control channels the eNodeB (or one or more components thereof) will select a jth precoding vector based on CSI received from a jth UE, and map a jth control channel that is precoded with the jth precoding vector to a jth CCE. For each of M antenna ports used for distributed control channels it will select either an antenna port from one of the N antenna ports that is used for localized control channels and is precoded with a jth precoding vector, or an antenna port that is not used for localized control channels, for which it selects further an ith precoding vector to be orthogonal to one of the jth precoding vectors, and for a transmission diversity scheme map the distributed control channels precoded with the set of M precoding vectors to an distributed E-CCE which lies in a same PRB as the localized E-CCEs. The eNodeB or components thereof will then multiplex the localized and distributed control channels on the E-CCEs in the PRB pair for transmission to a set of UEs, some of which may have no valid CSI and receive the distributed control channels.

Figure 9:
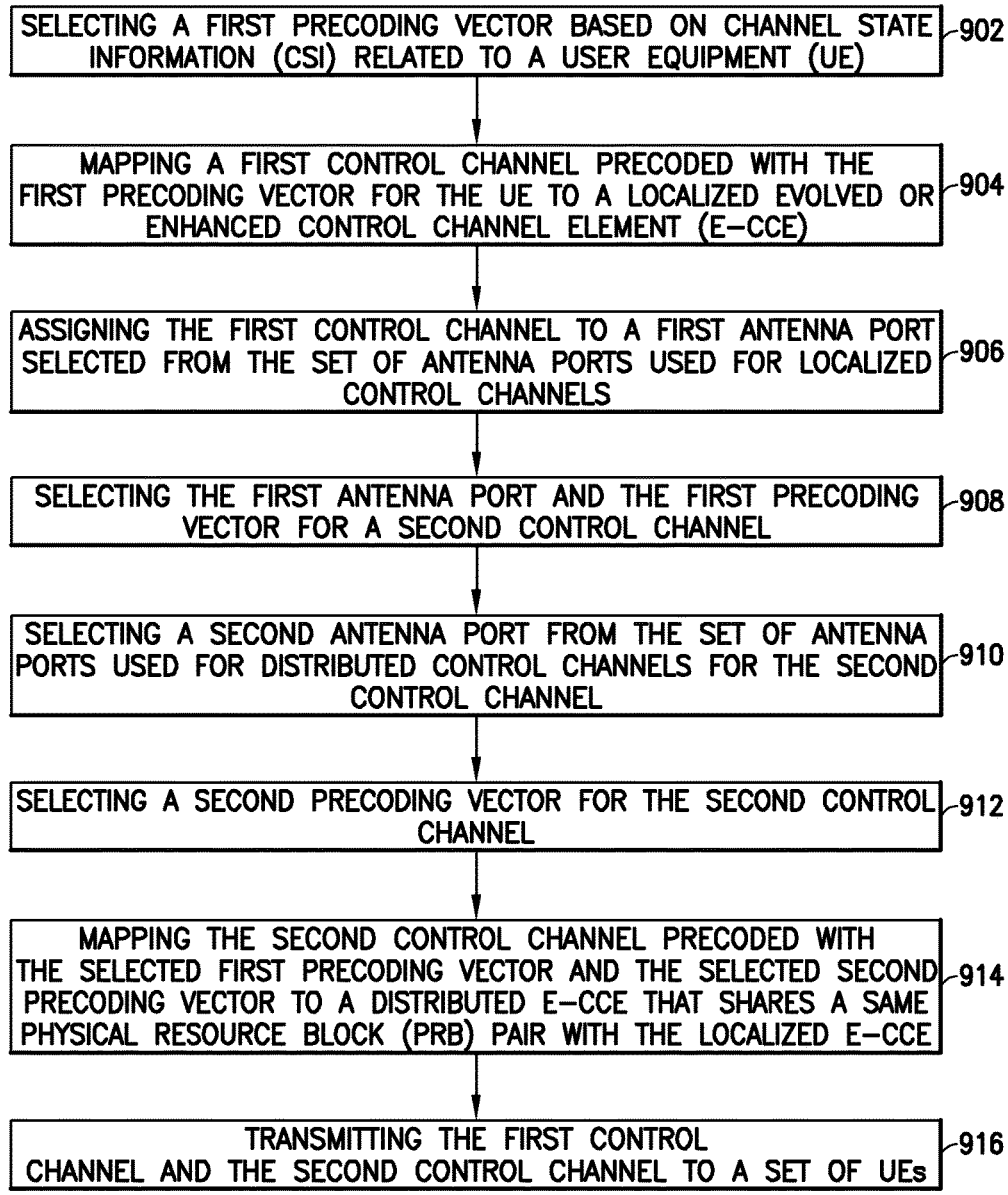
FIG. 9 is a flow diagram illustrating a method, and actions taken by an apparatus, and the result of executing an embodied computer program from the perspective of the eNodeB, according to the exemplary embodiments of the invention.

Turning now to FIG. 9 there is a flow diagram illustrating an exemplary method, and actions taken by a network access node such as a relay node, remote radio head or an eNodeB (or one or more components thereof), and the result of computer program instructions stored on a tangible memory when such instructions are executed by one or more processors. As an example of an apparatus such as the eNodeB performing the steps shown at FIG. 9, such an apparatus may include at least one processor and at least one memory including computer program code, which all together are configured in response to execution of the computer program code to cause the apparatus to perform the process of FIG. 9.

The method of FIG. 9 provides for antenna port sharing among N antenna ports used for localized control channels and M antenna ports used for distributed control channels. The method includes at Block 902 selecting a first precoding vector based on channel state information (CSI) related to a user equipment (UE); at Block 904 mapping a first control channel precoded with the first precoding vector for the UE to a localized evolved or enhanced control channel element (E-CCE); at Block 906 assigning the first control channel to a first antenna port selected from the set of antenna ports used for localized control channels; at Block 908 selecting the first antenna port and the first precoding vector for a second control channel; at Block 910 selecting a second antenna port from the set of antenna ports used for distributed control channels for the second control channel; at Block 912 selecting a second precoding vector for the second control channel; at Block 914 mapping the second control channel precoded with the selected first precoding vector and the selected second precoding vector to a distributed E-CCE that shares a same physical resource block (PRB) pair with the localized E-CCE; and at Block 916 transmitting the first control channel and the second control channel to a set of UEs. In the method N and M are positive integers, and in some embodiments N can be equal to 4 and M can be equal to 2.

In the method shown in FIG. 9 the steps of mapping the second control channel precoded with the first precoding vector and the second precoding vector to the distributed E-CCE, and transmitting the first control channel and the second control channel, can be performed for implementing a transmission diversity scheme.

In the method shown in FIG. 9 the second precoding vector can be selected independently of the first precoding vector, and in some embodiments the second precoding vector can be selected to be orthogonal to the first precoding vector.

Embodiments of these teachings as summarized at FIG. 7 and at FIG. 9, and which are further detailed more particularly above, may be implemented in tangibly embodied software, hardware, application logic or a combination of software, hardware and application logic. In an exemplary embodiment, the application logic, software or an instruction set is maintained on any one of various conventional computer-readable media. The methods represented by FIG. 7 and by FIG. 9 and the related description may be performed via hardware elements, via tangibly embodied software executing on a processor, or via combination of both. A program of computer-readable instructions may be embodied on a computer readable memory such as for example any of the MEMs detailed below with respect to FIG. 8.

If desired, the different functions discussed herein may be performed in a different order and/or concurrently with each other. Furthermore, if desired, one or more of the above-described functions may be optional or may be combined.

Figure 8:
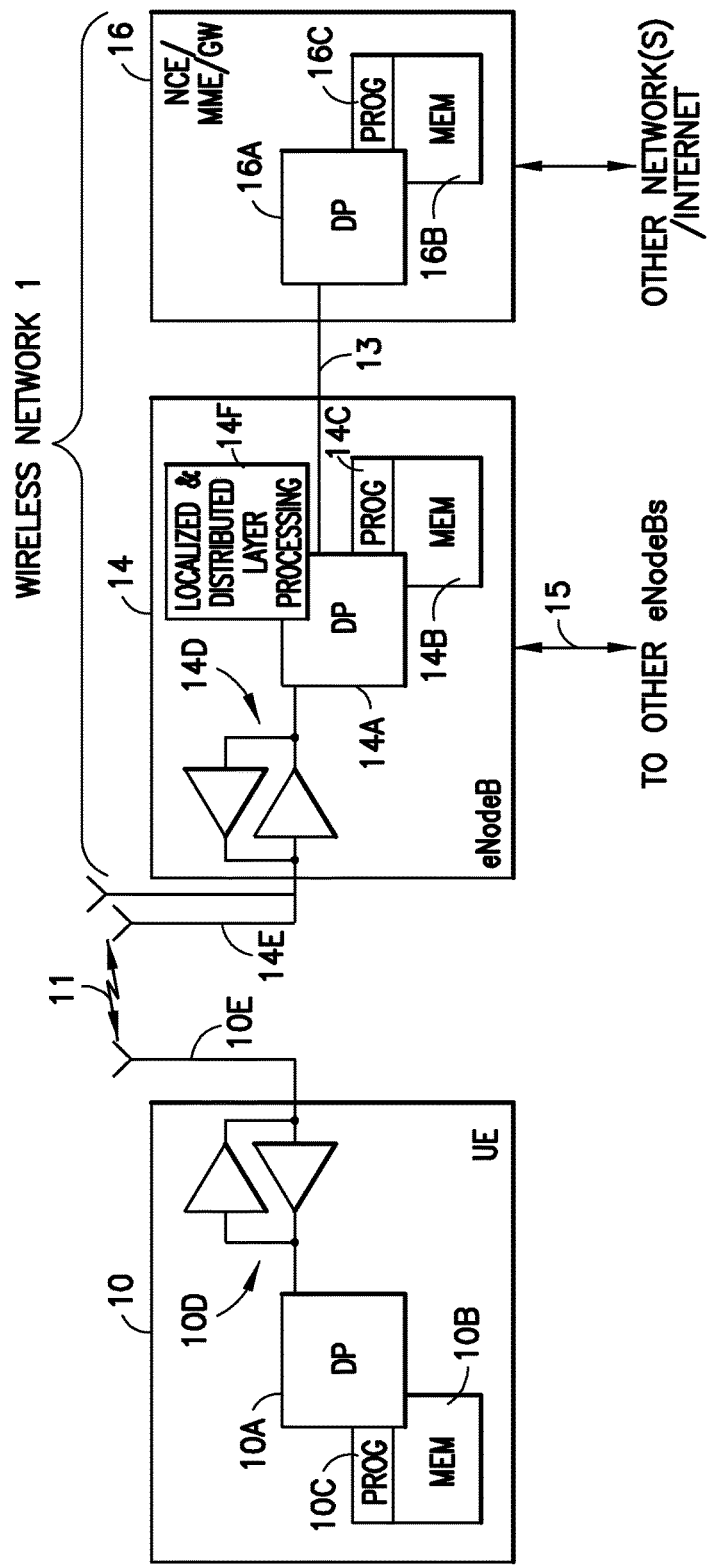
FIG. 8 is a schematic block diagram showing various electronic devices/apparatus suitable for implementing exemplary embodiments of the invention detailed herein.

Reference is now made to FIG. 8 for illustrating a simplified block diagram of various electronic devices and apparatus that are suitable for use in practicing the exemplary embodiments of this invention. In FIG. 8, a wireless network 1 is adapted for communication over a wireless link 11 with apparatus, such as a mobile communication device which may be referred to as a UE 10, via a network access node, such as an eNodeB 14 for the case of an LTE or LTE-A network. Each of the UEs 10 (one illustrated at FIG. 8)

communicates using a wireless link 11 with the eNodeB 14. For the UE(s) for which the eNodeB 14 does not have valid CSI the link 11 is MIMO with spatial diversity. The wireless network 1 may include a network control element (NCE) 16 that may implement mobility management entity (MME) and/or serving gateway (S-GW) functionality such as that known in the LTE system, and which provides connectivity with a further network, such as a publicly switched telephone network and/or a data communications network (e.g., the Internet).

The UE 10 includes a controller, such as a computer or a data processor (DP) 10A, a computer-readable memory (MEM) 10B that tangibly stores a program of computer instructions (PROG) 10C, and at least one suitable radio frequency (RF) transmitter and receiver (shown together as 10D) for bidirectional wireless communications with the eNodeB 14 via one or more antennas 10E (one shown). The UE 10 may also have functionality to demodulate the distributed control channel/E-PDCCH that it receives over the wireless link 11 using the DMRSs that correspond to the precoding vectors used by the eNodeB 14 to precode its E-PDCCH as detailed by example above.

The eNodeB 14 also includes a controller, such as a computer or a data processor (DP) 14A, a computer-readable memory (MEM) 14B that tangibly stores a program of computer instructions (PROG) 14C, and at least one suitable RF transmitter and receiver shown together as 14D) for communication with the UE 10 via one or more antennas 14E (two shown, but as with the above examples there may be four or even an antenna array of more than four). The eNodeB 14 has functionality to implement the localized and distributed precoding vector selection as detailed in the examples at FIGS. 3-6 and the summary at FIG. 7. The eNodeB 14 is additionally coupled via a data/control path 13 to the NCE 16. The NCE 16 also includes a controller, such as a computer or a data processor (DP) 16A and a computer-readable memory (MEM) 16B that stores a program of computer instructions (PROG) 16C. The NCE 16 may be connected to additional networks such as the Internet. The path 13 may be implemented as the Si interface known for the LTE system. The eNodeB 14 may also be coupled to another eNodeB (or Node B) via data/control path 15, which may be implemented as the X2 interface known in the LTE system.

The techniques herein may be considered as being implemented solely as computer program code embodied in a memory resident within the UE 10 or eNodeB 14 (e.g., as PROG 10C or 14C, respectively), or as a combination of embodied computer program code (executed by one or more processors) and various hardware, including memory locations, data processors, buffers, interfaces and the like, or entirely in hardware (such as in a very large scale integrated circuit). Additionally, the transmitters and receivers 10D and 14D may also be implemented using any type of wireless communications interface suitable to the local technical environment, for example, they may be implemented using individual transmitters, receivers, transceivers or a combination of such components.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 14A may be of any type suitable to the local technical environment, and may include one or more of general purpose computers, special purpose computers, microprocessors, digital signal processors (DSPs) and processors based on a multi-core processor architecture, as non-limiting examples.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
providing antenna port sharing among N antenna ports used for localized control channels and M antenna ports used for distributed control channels by
selecting a first precoding vector based on channel state information (CSI) related to a user equipment (UE);
mapping a first control channel precoded with the first precoding vector for the UE to a localized evolved or enhanced control channel element (E-CCE);
assigning the first control channel to a first antenna port selected from the set of antenna ports used for localized control channels;
selecting the first antenna port and the first precoding vector for a second control channel;
selecting a second antenna port from the set of antenna ports used for distributed control channels for the second control channel;
selecting a second precoding vector for the second control channel; and
mapping the second control channel precoded with the selected first precoding vector for the first antenna port and precoded with the selected second precoding vector for the second antenna port to a distributed E-CCE that shares a same physical resource block (PRB) pair with the localized E-CCE; and
transmitting the first control channel and the second control channel to a set of UEs,
where N and M are positive integers.

2. The method as in claim 1, where N=4 and M=2.

3. The method as in claim 1, where the steps of mapping the second control channel precoded with the first precoding vector and the second precoding vector to the distributed E-CCE, and transmitting the first control channel and the second control channel, are performed for implementing a transmission diversity scheme.

4. The method as in claim 1, where the second precoding vector is selected independently of the first precoding vector or is selected to be orthogonal to the first precoding vector.

5. The method according to claim 1, where at least one UE of the set of UEs has no valid channel state information (CSI) and receives distributed control channels.

6. The method according to claim 1, where the steps of selecting the first precoding vector and mapping the first control channel is performed in a first processing layer for localized control channels, and where the steps of selecting the second precoding vector and mapping the second control channel are performed in a second processing layer for distributed control channels.

7. The method according to claim 1, in which the localized E-CCE maps to a first antenna port, the distributed E-CCE maps to the first antenna port and to a second antenna port, and the transmission of the distributed E-CCE uses spatial diversity.

8. The method according to claim 1, wherein transmission to the set of UEs is via at least one of spatial frequency block codes (SFBC), frequency switching transmit diversity (FSTD), space time block codes (STBC), or precoder switching transmit diversity and each of the control channels is an evolved or enhanced physical downlink control channel (E-PDCCH).

9. The method according to claim 1, in which the method is executed by a network access node, where each of the control channels is an evolved or enhanced physical downlink control channel (E-PDCCH), and where transmission of a second E-PDCCH to a second UE is on four antenna ports, such that:
a first spatial layer of the second E-PDCCH is on the first antenna port and is precoded with the first precoding vector;
a second spatial layer of the second E-PDCCH is on the second antenna port and is precoded with the second precoding vector;
a third spatial layer of the second E-PDCCH is on a third antenna port and is not precoded; and
a fourth spatial layer of the second E-PDCCH is on a fourth antenna port and is not precoded.

10. The method according to claim 1, in which the UE is a first UE, in which the method is executed by a network access node, where each of the control channels is an evolved or enhanced physical downlink control channel (E-PDCCH), in which:
a first processing layer for localized control channels executes a method that comprises:
selecting the first precoding vector based on CSI related to the first UE,
selecting a third precoding vector based on CSI related to another UE,
mapping the first control channel precoded with the first precoding vector to a first E-CCE; and
mapping a third control channel precoded with a third precoding vector to a third E-CCE that maps to a third antenna port;
a second processing layer for distributed control channels executes a method that comprises:
selecting the second precoding vector,
selecting a fourth precoding vector;
mapping the second control channel precoded with the first, second, third, and fourth precoding vectors to a second E-CCE which shares the same PRB with the first E-CCE.

11. The method of claim 10, where the second precoding vector is selected to be orthogonal to the first precoding vector, and the fourth precoding vector is selected to be orthogonal to the third precoding vector.

12. The method according to claim 1, in which the UE is a first UE, in which the method is executed by a network access node, where each of the control channels is an evolved or enhanced physical downlink control channel (E-PDCCH), wherein:
a first processing layer for the localized control channels executes a method that comprises:
selecting the first precoding vector based on CSI related to the first UE,
selecting a third precoding vector based on CSI related to another UE, selecting a fourth precoding vector based on CST related to a further UE;
in response to determining that cross correlation is minimized between the third and fourth precoding vectors as compared to any other pair of the first, third and fourth precoding vectors, mapping a third control channel precoded with the third precoding vector to a third E-CCE and mapping a fourth control channel precoded with the fourth precoding vector to a fourth E-CCE; and
mapping the first control channel precoded with the remaining first precoding vector to the first E-CCE that maps to the first antenna port.

13. The method according to claim 12, where transmission of a second E-PDCCH to a second UE is on four antenna ports, such that:
a first spatial layer of the second E-PDCCH is on the first antenna port and is precoded with the first precoding vector;
a second spatial layer of the second E-PDCCH is on the second antenna port and is precoded with the second precoding vector;
a third spatial layer of the second E-PDCCH is on a third antenna port and is precoded with the third precoding vector; and
a fourth spatial layer of the second E-PDCCH is on a fourth antenna port and is precoded with the fourth precoding vector.

14. An apparatus, comprising:
a processor; and
a memory including computer program code, where the memory and computer program code are configured to, with the processor, cause the apparatus at least to provide antenna port sharing among N antenna ports used for localized control channels and M antenna ports used for distributed control channels by operations that comprise:
selecting a first precoding vector based on channel state information (CSI) related to a user equipment (UE);
mapping a first control channel precoded with the first precoding vector for the UE to a localized evolved or enhanced control channel element (E-CCE);
assigning the first control channel to a first antenna port selected from the set of antenna ports used for localized control channels; selecting the first antenna port and the first precoding vector for a second control channel;
selecting a second antenna port from the set of antenna ports used for distributed control channels for the second control channel; selecting a second precoding vector for the second control channel;
mapping the second control channel precoded with the selected first precoding vector for the first antenna port and precoded with the selected second precoding vector for the second antenna port to a distributed E-CCE that shares a same physical resource block (PRB) pair with the localized E-CCE; and transmitting the first control channel and the second control channel to a set of UEs, where N and M are positive integers.

15. The apparatus as in claim 14, where the operations of mapping the second control channel precoded with the first precoding vector and the second precoding vector to the distributed E-CCE, and transmitting the first control channel and the second control channel, are performed for implementing a transmission diversity scheme.

16. The apparatus as in claim 14, where the second precoding vector is selected independently of the first precoding vector, or is selected to be orthogonal to the first precoding vector.

17. The apparatus as in claim 14, where at least one UE of the set of UEs has no valid channel state information (CSI) and receives distributed control channels.

18. The apparatus as in claim 14, where the operations of selecting the first precoding vector and mapping the first control channel is performed in a first processing layer for localized control channels, and where the steps of selecting the second precoding vector and mapping the second control channel are performed in a second processing layer for distributed control channels.

19. The apparatus as in claim 14, in which the localized E-CCE maps to a first antenna port, the distributed E-CCE maps to the first antenna port and to a second antenna port, and the transmission of the distributed E-CCE uses spatial diversity.

20. The apparatus as in claim 14, where transmission to the set of UEs is via at least one of spatial frequency block codes (SFBC), frequency switching transmit diversity (FSTD), space time block codes (STBC), or precoder switching transmit diversity and each of the control channels is an evolved or enhanced physical downlink control channel (E-PDCCH).

21. The apparatus as in claim 14, embodied in a network access node, where each of the control channels is an evolved or enhanced physical downlink control channel (E-PDCCH), and where transmission of a second E-PDCCH to a second UE is on four antenna ports, such that:
 a first spatial layer of the second E-PDCCH is on the first antenna port and is precoded with the first precoding vector;
 a second spatial layer of the second E-PDCCH is on the second antenna port and is precoded with the second precoding vector;
 a third spatial layer of the second E-PDCCH is on a third antenna port and is not precoded; and
 a fourth spatial layer of the second E-PDCCH is on a fourth antenna port and is not precoded.

22. The apparatus as in claim 14, embodied in a network access node, in which the UE is a first UE, where each of the control channels is an evolved or enhanced physical downlink control channel (E-PDCCH), in which:
 a first processing layer for localized control channels performs operations that comprise:
 selecting the first precoding vector based on CSI related to the first UE,
 selecting a third precoding vector based on CSI related to another UE,
 mapping the first control channel precoded with the first precoding vector to a first E-CCE; and
 mapping a third control channel precoded with a third precoding vector to a third E-CCE that maps to a third antenna port;
 a second processing layer for distributed control channels performs operations that comprise:
 selecting the second precoding vector,
 selecting a fourth precoding vector;
 mapping the second control channel precoded with the first, second, third, and fourth precoding vectors to a second E-CCE which shares the same PRB with the first E-CCE.

23. The apparatus of claim 22, where the second precoding vector is selected to be orthogonal to the first precoding vector, and the fourth precoding vector is selected to be orthogonal to the third precoding vector.

24. The apparatus according to claim 14, embodied in a network access node, in which the UE is a first UE, where each of the control channels is an evolved or enhanced physical downlink control channel (E-PDCCH), wherein:
 a first processing layer for the localized control channels performs operations that comprise:
 selecting the first precoding vector based on CSI related to a first UE,
 selecting a third precoding vector based on CSI related to another UE,
 selecting a fourth precoding vector based on CSI related to a further UE;
 in response to determining that cross correlation is minimized between the third and fourth precoding vectors as compared to any other pair of the first, third and fourth precoding vectors, mapping a third control channel precoded with the third precoding vector to a third E-CCE and mapping a fourth control channel precoded with the fourth precoding vector to a fourth E-CCE; and
 mapping the first control channel precoded with the remaining first precoding vector to the first E-CCE that maps to the first antenna port.

25. The apparatus according to claim 24, where transmission of a second E-PDCCH to a second UE is on four antenna ports, such that:
 a first spatial layer of the second E-PDCCH is on the first antenna port and is precoded with the first precoding vector;
 a second spatial layer of the second E-PDCCH is on the second antenna port and is precoded with the second precoding vector;
 a third spatial layer of the second E-PDCCH is on a third antenna port and is precoded with the third precoding vector; and
 a fourth spatial layer of the second E-PDCCH is on a fourth antenna port and is precoded with the fourth precoding vector.

\* \* \* \* \*